March 24, 1970     M. H. MATER     3,502,124
POLE BORING MACHINE
Filed Oct. 2, 1967     4 Sheets-Sheet 1
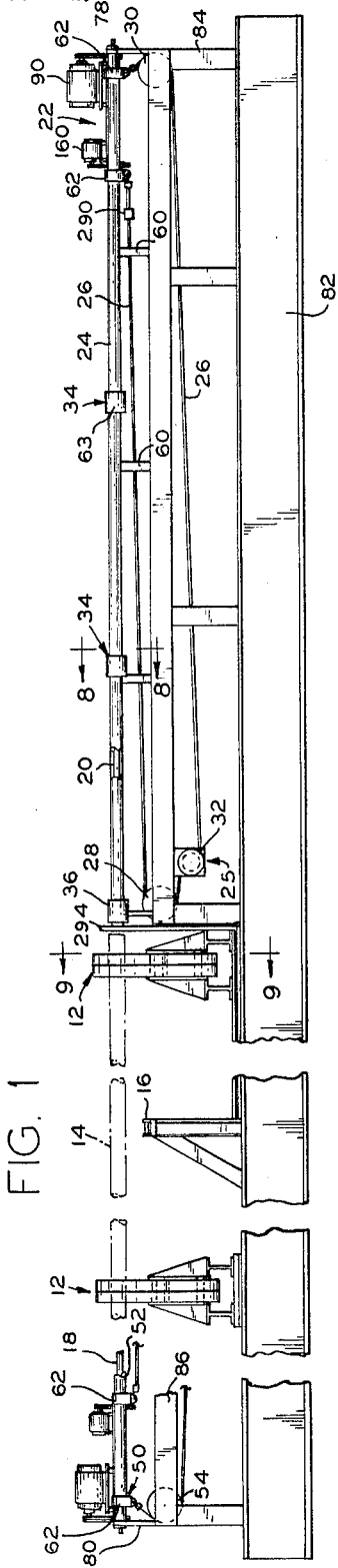
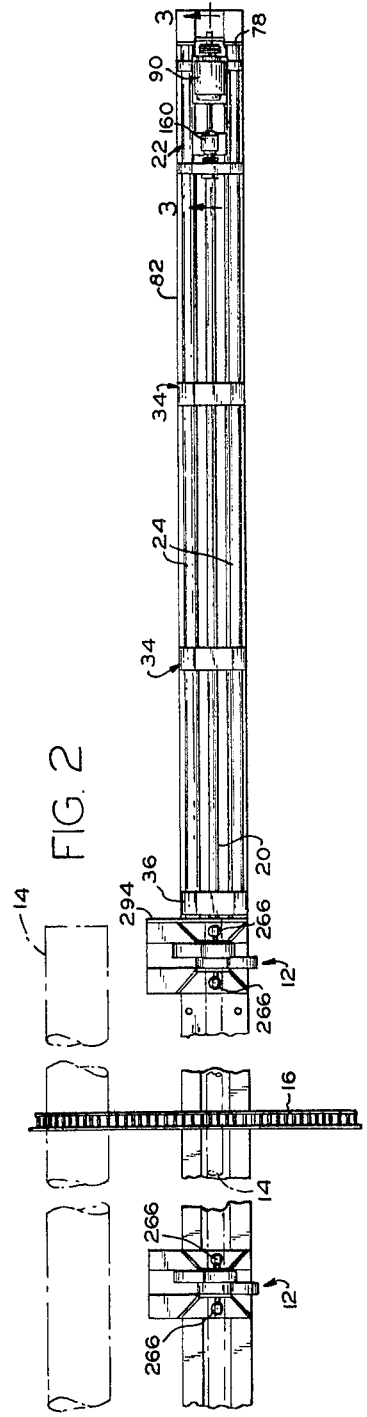
MILTON H. MATER
INVENTOR
BY
BUCKHORN, BLORE, KLARQUIST & SPARKMAN
ATTORNEYS

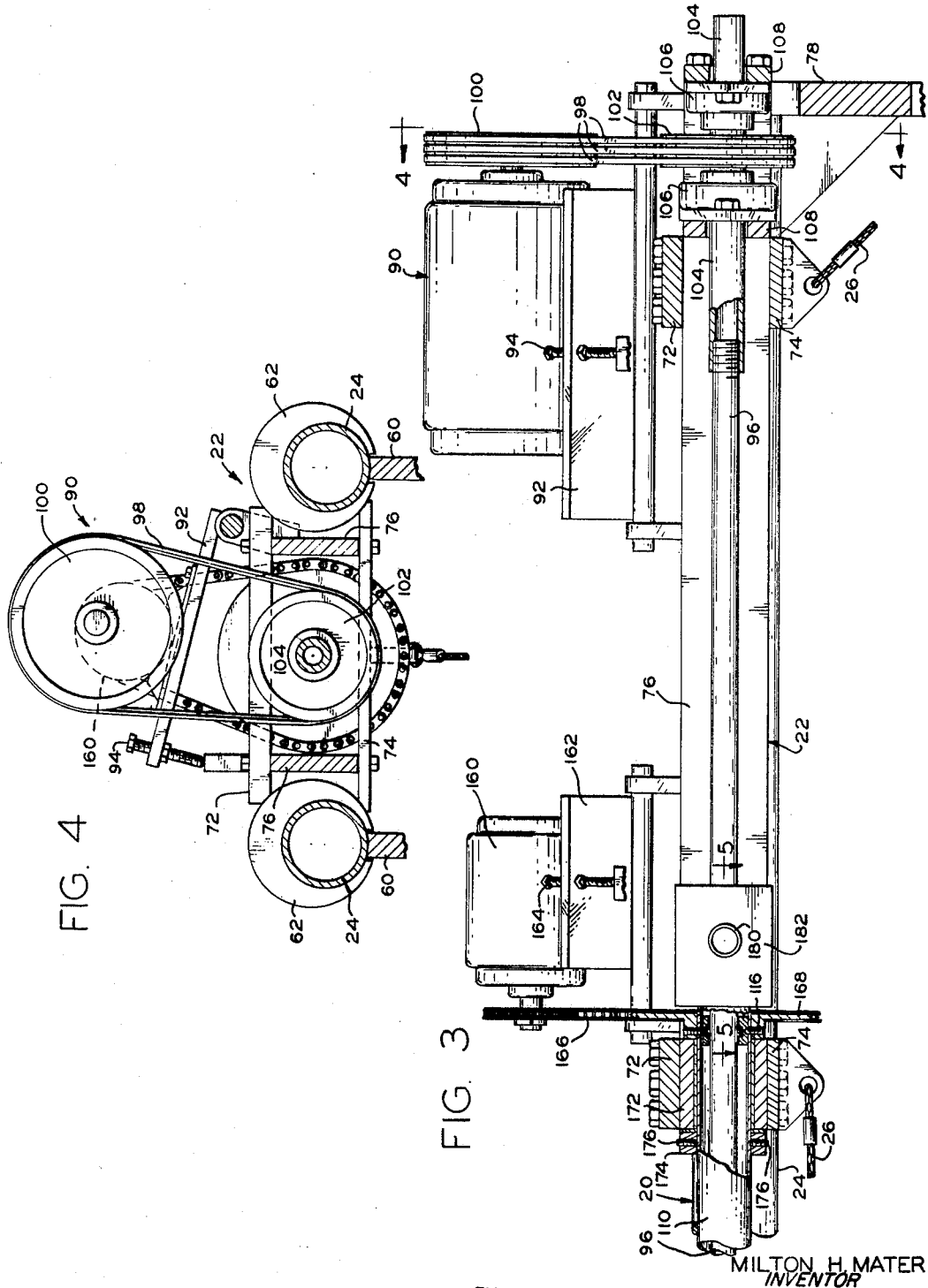

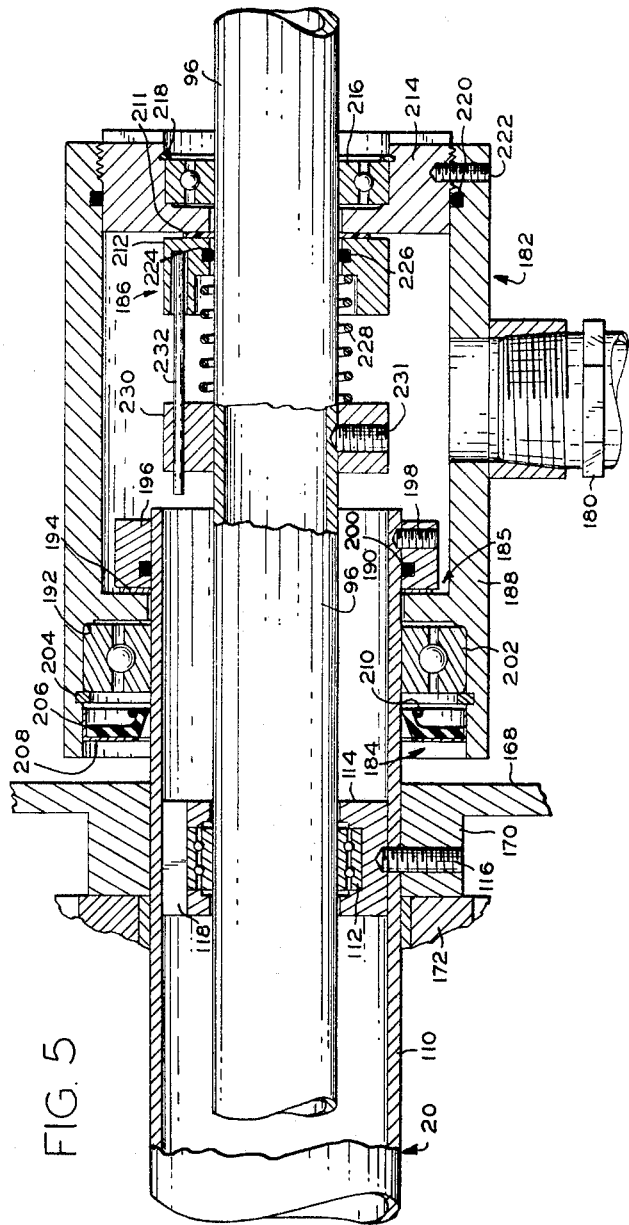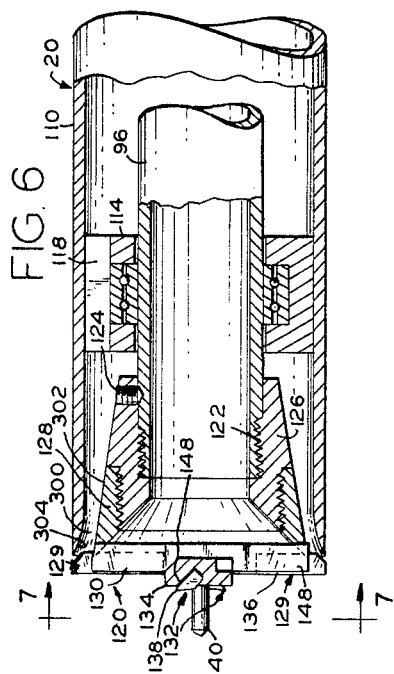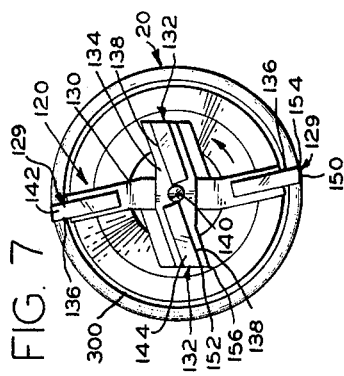

March 24, 1970     M. H. MATER     3,502,124
POLE BORING MACHINE
Filed Oct. 2, 1967     4 Sheets-Sheet 4
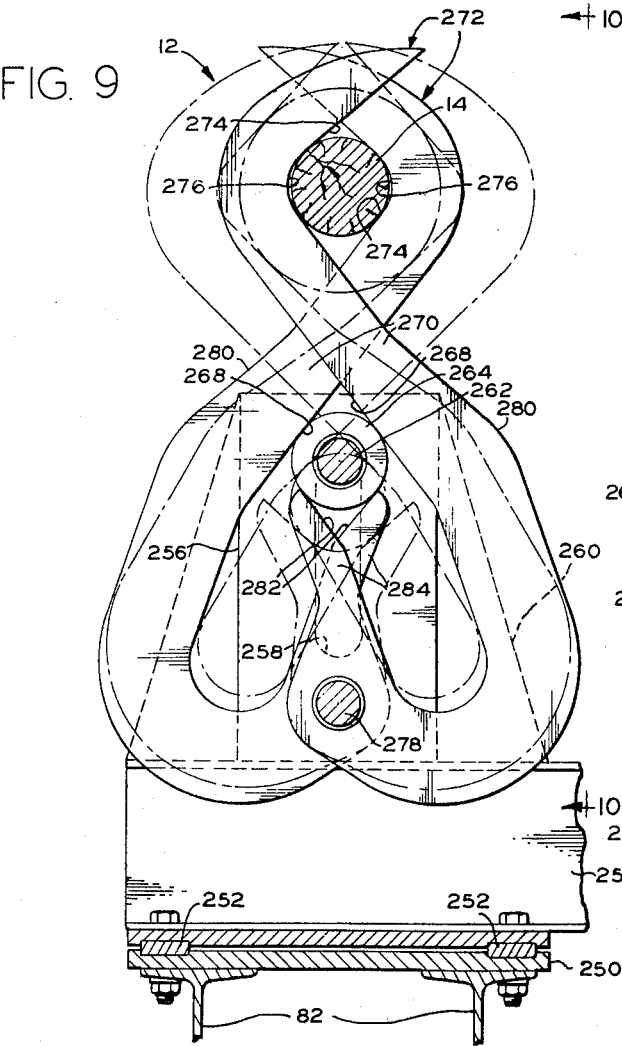
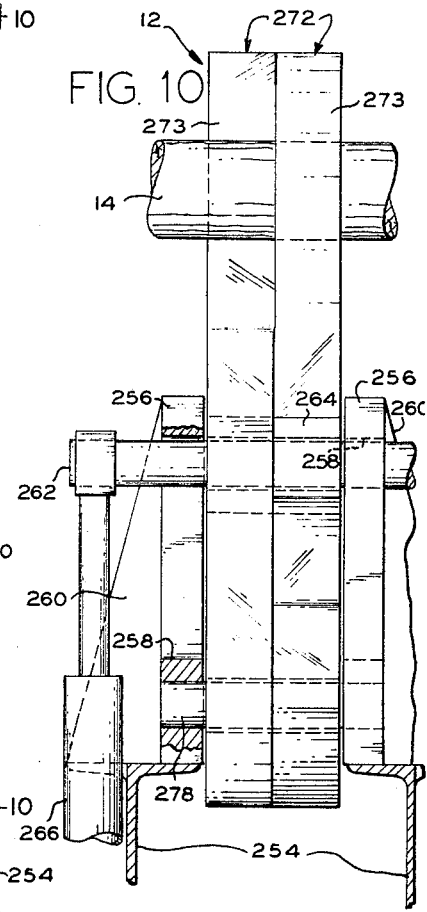
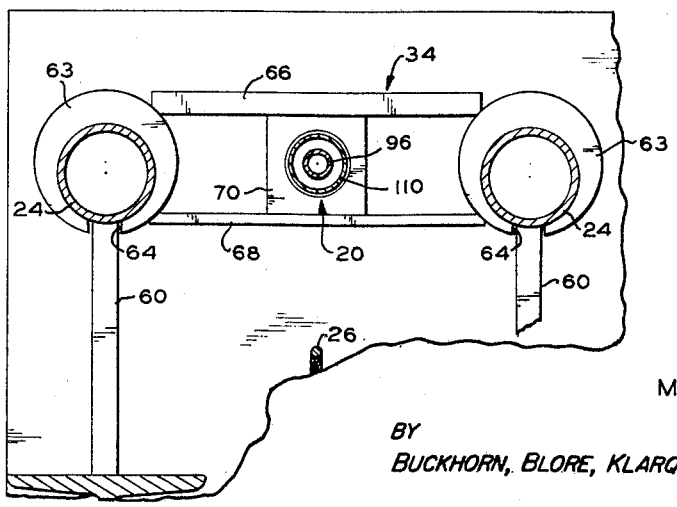
MILTON H. MATER
*INVENTOR*
BY
BUCKHORN, BLORE, KLARQUIST & SPARKMAN
*ATTORNEYS*

United States Patent Office 3,502,124
Patented Mar. 24, 1970

3,502,124
POLE BORING MACHINE
Milton H. Mater, 1415 Brook Lane,
Corvallis, Oreg. 97330
Filed Oct. 2, 1967, Ser. No. 672,064
Int. Cl. B27c 3/02
U.S. Cl. 144—113     8 Claims

ABSTRACT OF THE DISCLOSURE

A pair of aligned drills each includes a drill tube carrying a drill bit including a forward pilot pin, forward cutters of a smaller diameter and rearward cutters of a larger diameter. The drill tube is rotated and drills an axial hole in a pole slightly larger than a guide tube, which extends to a point just behind the rearward cutters and journals the drill tube. Pressurized air fed into the guide tube through a rotary coupling travels through a venturi passage at the forward end of the guide tube and carries chips from the drill bit back through the drill tube. The guide tube is rotated slowly to dislodge chips and facilitate movement of the guide tube into the bore being formed. A carriage slidable on tubular ways and guides slidable on the ways support the guide tube and is moved forwardly slowly by a cable drive to feed the drill and is returned rapidly by the cable drive. The drills are moved forwardly from opposite ends of the pole to be drilled until one drill reaches the end of its feed stroke and then this drill is retracted while the other drill completes its stroke. A slidable interlock prevents the drills from coming together and reverses the motion of the carriage of one of the drills when the drills closely approach each other. Opposed clamps having generally V-shaped jaws on the ends of tongs grip and center the pole relative to the drills. The rotary coupling forms pressure-tight seals both with the drill tube and the guide tube. Spiders in the guide tube mount ball bearings journaling the drill tube and permit flow of air along the space between the drill tube and the guide tube.

Description

This invention relates to a pole boring machine, and more particularly to a machine for precisely boring a hole in a pole.

In machines known hitherto for boring deep holes in logs, there have been problems in guiding the drills to precisely bore the holes without drift and in clearing chips from drill bits thereof. Many attempts have been made to solve these problems, but with little success. It would be desirable to provide a pole boring machine which very precisely forms a straight, deep bore in the pole and which effectively clears chips from the bore.

An object of the invention is to provide a new and improved pole boring machine.

Another object of the invention is to provide a machine for precisely boring a hole in a pole.

A further object of the invention is to provide a pole boring machine which effectively clears chips from a bore being formed in a pole.

Another object of the invention is to provide an improved drill bit structure for a pole boring machine.

Another object of the invention is to provide a drill in which an inner drill tube drives a drill bit forming a bore large enough to slidably receive an outer guide tube journaling the drill tube.

A further object of the invention is to provide a drill bit including a forward pilot pin, a small forward cutter and a larger rearward cutter which is transverse to the forward cutter.

Another object of the invention is to provide a drill supported by guides which are initially spaced apart and by a carriage which pushes the guides forwardly toward a pole as a bore is formed in the pole.

Another object of the invention is to provide a pole boring machine having two drills movable toward each other through opposite ends of a pole and an interlock adapted to keep the drills from engaging each other.

The invention provides a pole drilling machine in which a drill is moved into a pole by a carriage supporting the rear end of the drill. The carriage is movable along ways, and centering clamps grip the pole at the ends of the ways. Preferably the drill includes a rapidly rotated drill tube journaled in a slowly rotated guide tube, a drill bit carried at the forward end of the drill tube drills a bore just slightly larger than the guide tube, and air under pressure is forced between the drill tube and the guide tube, through a venturi passage just behind the drill bit and back through the drill tube with chips created by the boring. Preferably the air is introduced into the drill through a rotary coupling sealingly engaging both the guide tube and the drill tube, and the guide tube preferably is rotated slowly to facilitate feed of the guide tube into the bore. The carriage is movable along ways, and guides rotatably supporting the guide tube at spaced points therealong and slidable on the ways preferably are provided.

A complete understanding of the invention may be obtained from the following detailed description of a pole boring machine forming a specific embodiment thereof, when read in conjunction with the appended drawings, in which:

FIG. 1 is a fragmentary, side elevation view of a pole boring machine forming one embodiment of the invention;

FIG. 2 is a fragmentary, top plan view of the pole boring machine of FIG. 1;

FIG. 3 is an enlarged vertical sectional view taken along line 3—3 of FIG. 2;

FIG. 4 is an enlarged vertical sectional view taken along line 4—4 of FIG. 3;

FIG. 5 is an enlarged horizontal sectional view taken along line 5—5 of FIG. 3;

FIG. 6 is an enlarged longitudinal section of a drill of the pole boring machine of FIG 1;

FIG. 7 is an enlarged elevation view taken along line 7—7 of FIG. 6;

FIG. 8 is an enlarged vertical sectional view taken along line 8—8 of FIG. 1;

FIG. 9 is an enlarged vertical sectional view taken along line 9—9 of FIG. 1; and FIG. 10 is an enlarged vertical sectional view taken along line 10—10 of FIG. 9.

Referring now in detail to the drawings, a pole boring machine shown therein includes a plurality of centering clamps 12 adapted to lift a wooden pole 14 from spaced delivery transfer chains 16 laterally spaced from the clamps, and hold the pole in a position precisely aligned with aligned, identical drills or drilling assemblies 18 and 20. Each drilling assembly is supported at its rear end by a carriage 22 slidable along a pair of tubular ways 24 by a carriage feed device 25 including a cable 26 secured to the carriage and traveling around end guide pulleys 28 and 30 and a reversible, motor driven capstan 32, which advances the carriage slowly in a work stroke and returns the carriage rapidly in a retracting stroke. As the carriage is moved in its forward or work stroke it engages and pushes forwardly intermediate guides 34 slidable along the ways and moves the guides 34 up to a front end guide 36 at the adjacent end of the pole, the guide 36 also being slidable on the ways.

The guides 34 and 36 slidably and rotatably support the drilling assembly 20.

The drilling assembly 18 is similarly supported at its rear end by a carriage 50 slidable on ways 52 and by intermediate guides like the guides 34 and a front end guide like the guide 36, the intermediate guides and the front end guide being slidable on the ways 52. A carriage feed device 54 like the carriage feed device 25 serves to advance the carriage 50 slowly to the right, as viewed in FIG. 1, in its work stroke and returns the carriage rapidly to the left in its return stroke.

The tubular ways 24 and 52 are supported rigidly by posts 60 (FIGS. 1 and 8) and the carriages 22 and 50 and guides 34 and 36 have C-shaped slides 62 and 63 having clearance gaps 64 to clear the posts. The guides 34 and 36 have cross members 66 and 68 supporting a guide block 70 and welded to the slides 62. The carriages 22 and 50 each have cross members 72 and 74 (FIGS. 3 and 4) welded to the slides 62 and bolted to longitudinal members 76. The ends of the ways 24 and 52 are supported by end frames 78 and 80, respectively. The end frames 78 and 80 and the posts 60 are supported by a heavy, rigid bed including I-beams 82 (FIGS. 1 and 9) supporting rigid intermediate frames 84 and 86, which are welded to the I-beams and to the posts 60 and end frames 78 and 80.

The drilling assemblies 18 and 20 are identical, as are the carriages 22 and 50. The carriage 22 carries a high powered electric motor 90 (FIGS. 1, 3 and 4) through a plate 92 hinged to the carriage and adjustable relative thereto by an adjustment screw 94. The motor 90 drives an inner, drill tube 96 of the drilling assembly 20 through belts 98 and sheaves 100 and 102, the sheave 102 being keyed to an end section 104 of the drill tube 96. The end section 104 is journaled in rotary and thrust bearings 106 carried by cross members 108 of the carriage 22.

The drill tube 96 extends concentrically along and through a guide tube 110 of the drilling assembly 20 and is journaled in ball bearings 112 (FIG. 5) carried by spiders 114 secured by set screws 116 to the guide tube at spaced points along the guide tube. The spiders 114 have air passages 118 therethrough.

A drill bit 120 (FIGS. 6 and 7) is secured to the left-hand end of the tube 96 by threads 122 and a set screw 124. The bit 120 includes a tapered, tapped, counterbored mounting sleeve 126 screwed onto the tube 96, and a tapered, tapped, drill carrying sleeve 128 is screwed onto the forward end of the sleeve 126. A pair of carbide outer cutters 129 are carried by a rigid, somewhat Z-shaped cross member 130 brazed to and extending beyond the outer end or lip portion of the sleeve 128, and a pair of carbide inner cutters 132 are carried by a rigid, somewhat Z-shaped cross member 134 in advance of the cutters 129. The cutters extend inwardly and somewhat rearwardly from outer ends thereof, as do cutting edges 136 and 138 of the cutters, respectively. A pointed, cylindrical pilot pin 140 extends forwardly from the center of the members 130 and 134. The cutting edges 136 and 138 are the forward edges of slightly relieved front faces 142 and 144 of the cutters 129 and 132 and faces 146 and 148. Ends 150 and 152 also are slightly relieved to provide clearance behind cutting edges 154 and 156 extending parallel to the longitudinal axis of the drill tube 96. The pilot pin 140 is pushed into the center of the pole ahead of the cutters and the cutting edges 138 of the cutters 132 extend equidistantly from the pilot pin and lie in a plane normal to the coincident axes of the pilot pin and the tubes 96 and 110, which may be termed the axis of the drill. The cutting edges 136 lie in a plane normal to the axis of the drill and extend outwardly from the inner ends thereof, which are inside a circle generated by the outer ends of the edges 138, to points substantially beyond that circle. The outer ends of the edges 136 are equidistant from the axis of the drill. The alternating cutters 129 and 132 are spaced 90° apart, and the cutting edges 138 are positioned at least 5/16 inch forwardly of the cutting edges 136 along the axis of the drill to prevent clogging. The cutting edges 138 bore a smaller hole in the pole in advance of the cutting edges 136 which bore a larger hole concentric to the smaller hole. For best results, the edges 136 extend sufficiently farther outwardly than the edges 138 that the ratio of the diameter of the larger hole to that of the smaller hole is about 5:3.

The outer ends of each cutting edge 136 extend about 1/32 inch beyond the outer periphery of the guide tube 110 so that the tube 110 feeds smoothly into the bore formed by the cutting edges 136 as the tube 110 is rotated slowly at about ten revolutions per minute by an electric motor 160 (FIGS. 1 to 4) mounted on the carriage 22. The motor is mounted adjustably by a hinged plate 162 and an adjustment screw 164, and drives the tube 110 by a motor sprocket, a chain 166 and a sprocket 168 keyed to the tube 110. Hub 170 of the sprocket 168 is adapted to bear against thrust bearing 172 carried by the carriage, and the thrust bearing 172 bears against thrust collar 174 pinned to the tube 110 by set screws 176.

Air under pressure is supplied to the rear end of the tube 110 from a hose 180 (FIG. 5) and a rotary coupling 182. The coupling 182 forms rotary, sealed joints 184, 185 and 186 with the external peripheries of the tubes 96 and 110. The coupling includes a sleeve 188 having an internal collar 190 bracketed by a shoulder 192 and a washer 194 with a ring 196 secured to the drill tube 96 by set screws 198 and containing an O-ring 200 bearing against the washer 194 and a radial and thrust bearing 202 held against and sealed by the shoulder 192 by a split ring 204. A flanged annular seal 206 is held in position engaging the tube 110 by a flanged annular retainer 208 and a spring 210. The joint 186 includes a washer-like seal 211 held between a pressure ring 212 and a counterbored ring 214 carrying bearing 216 retained in its counterbore by split ring 218, the bearing 216 journaling the tube 96. An O-ring 220 seals the exterior of the ring 214 and the sleeve 188. A set screw 222 secures the ring 214 in the end of the sleeve 188. The ring 212 has an internal groove 224 containing O-ring 226 and is counterbored to receive one end of compression spring 228 seated against collar 230 pinned to the tube 96 by set screw 231. A rod 232 splines the pressure ring 212 to the collar 230.

Each of the clamps 12 (FIGS. 1, 2, 9 and 10) includes a base plate 250, keying bars 252 and spaced apart cross beams 254 bolted together and to the tops of I-beams 82. Vertical guide plates 256 having parallel, aligned slots 258 are mounted rigidly on the top flanges of the cross beams 254 and are braced by braces 260. A pin 262 carrying an actuating roller 264 is movable up and down in the slots 258 by cylinder drives 266. The roller extends between the parallel plates 256 with enough clearance to be freely movable vertically, and, when moved upwardly, engages follower edges 268 of arms 270 of crossed, tong-like clamping levers 272 having jaws 273 including opposed clamping notches 274, each subtending an angle of 90° and having a rounded apex 276. The levers 272 are hinged on a pin 278 mounted in the plates 256, and the roller 264 pressing against the follower edges 268 moves the jaws 273 toward each other and edges 280 of the levers lift the pole 14 upwardly from the chains 16 to a position between the jaws 273 which then clamp the pole in centered position between the jaws and aligned with the drilling assemblies 18 and 20 (FIG. 1). When the cylinder drives 266 are actuated to pull the roller 264 (FIG. 9) downwardly, the roller pushes against follower edges 282 of arms 284 of the lever to swing the arms 270 apart and lower the pole onto the chains 16 (FIG. 1). The follower edges 268 and 282 (FIG. 9) are so shaped that all four of the edges are always in contact with the actuating roller 264. The levers 272 of each clamp 12 always raise the pole and, regardless of the diameter of the pole within a wide range of diameters from 6 inches to 18 inches, center the clamped portion in alignment with the drilling assemblies. Consequently, the clamps 16 always clamp a tapered pole in precise alignment with the drilling assemblies.

The guides 36 (FIGS. 1 and 2) are normally positioned adjacent the ends of the poles and the guides 34 are connected by chains or cables (not shown) to the carriages 22 and 50, which pull the guides 34 back to the spaced positions shown when the carriages are retracted to support the drilling assemblies 18 and 20 at substantially equally spaced points along the lengths. As the carriages are moved in boring, the carriages sequentially push the guides 34 along the ways 24 and 52 toward the pole. To prevent the drilling assemblies 18 and 20 from running into each other as the bore is completed through the entire length of the pole, actuators 290 mounted on the carriage drives 25 and 54 engage interlocking limit switches to stop the carriage drive 25 in a clearing position if the drilling assembly 18 has not completed its stroke until the drilling assembly 18 completes its stroke, the drive 54 is reversed to retract the drilling assembly 18 and the drilling assembly 18 reaches a clearing position, at which time its actuator 290 actuates a limit switch to restart the drive 25. The drilling assembly 20 then completes its stroke to drill somewhat into the bore formed by the drill 18, and the actuator 290 then actuates a limit switch to reverse the drive 25 to retract the drilling assembly 18. The drives 25 and 54 feed the drilling assemblies forwardly as fast as the drilling permits, and retract the drilling assemblies much more rapidly, the motors 90 and 160 being driven continuously so that the tubes 96 and 110 are continuously rotated to aid in withdrawing the drilling assemblies from the bores. Support plates 294 having aligned clearance holes for the drills are carried in fixed positions at the ends of the ways 24 and 52.

Operation

The pole 14 (FIGS. 1 and 2) is carried by the chains 16 from a loading deck to a position over the clamps 12, a previously bored pole being simultaneously carried away from the clamps by the chains 16. With the guides 36 positioned near the ends of the poles and supporting the outer or boring ends of the drilling assemblies 18 and 20, the guides 34 supporting the intermediate portions of the drilling assemblies, and the carriages 22 and 50 supporting the outer ends of the drilling assemblies, the motors 90 and 160 running to rotate the outer tubes 110 at about 10 revolutions per minute and the inner drill tubes 96 at high speeds of from 1200 to 1850 revolutions per minute, the clamps 12 are actuated to raise the pole and clamp it in a position aligned with the drilling assemblies 18 and 20. The carriage drives 25 and 54 then are actuated to move the carriages 22 and 50 and the drills toward the pole. The pilot pins move into the centers of the ends of the pole, the cutters 132 form short advance bores and the cutters 120 form counterbores. Air under pressure travels from the rotary couplings 182 in the outer tubes 110 and outside of the inner drill tubes 96 and travel through venturi passages 300 (FIG. 6) defined by outer frustoconical surfaces 302 of the members 128 and tapering, rounded inner end surfaces 304 of the tubes 96. The air travels from each passage 300 in an annular jet of high velocity and blows through the drilling areas and back into and through the tube 96 and out the rear end of the tube carrying sawdust and chips therewith. The slowly rotating guide tubes 110 fit in the bores being formed just loosely enough to permit the tubes 110 to be easily rotated in and easily fed along the bores and support the drilling end portions of the tubes 96. The tubes 110, with the pilot pins 140, very precisely center the drilling assemblies 18 and 20 in the pole, and for drilling poles of 40 foot length, the bores from each end meet with no greater than a small fraction of an inch misalignment.

As the carriages 22 and 50 (FIGS. 1 and 2) are moved in their drilling strokes, they engage and push the adjacent guides 34 along the ways 14 and 24 and then these guides engage and push along the ways the next guides 34. As the carriages are retracted, chains connecting them to the adjacent guides 34 and connecting the guides 34 pull the guides 34 back to their start positions. The carriages 22 and 50 move in their drilling strokes until the carriage 50 completes its stroke or until the carriages approach a minimum distance apart. If the former, the carriage 50 is retracted and the carriage 22 completes its drilling stroke and is retracted. If the latter, the carriage 22 stops until the carriage 50 completes its drilling stroke and is retracted past a clearing position, after which the carriage 22 completes its drilling stroke and is retracted. For a pole shorter than the feed stroke of one of the drills, only that drill is actuated to bore the pole completely. For drill bits of 2½ inch diameter, a speed of rotation of the tubes 96 from 1200 to 1850 revoutions per minute is used. For drill bits of 4 inch or 6 inch diameters, the speed of rotation of the tube 96 may be 600 revolutions per minute or lower. For drill bits of 2½ inch diameters, the linear feed of the drilling assemblies is about 19 feet per minute.

If desired, there may be provided a floating interlock engageable by the carriages 22 and 50 when the carriages approach each other a minimum desired distance. This interlock would positively block closer approach of the carriages and preferably includes controls actuated by compressive force thereon to actuate the carriage drive 25 to retract the carriage 22 to a clearing position until the carriage 50 completes its stroke.

The holes drilled in wooden poles by the above described machine are kept very straight by the above described relationship of the guide tube 110, the drill tube 96 and the diameter of the drill bit, which is just slightly greater than the external diameter of he guide tube. The machine serves to rapidly bore holes in opposite ends of a woody pole upward of forty feet in length with the holes meeting at the center of the pole with misalignment held to a small fraction of an inch.

What is claimed is:
1. In a pole boring machine,
   a drill tube,
   a guide tube concentric to the drill tube and defining an annular passage therebetween,
   means in the guide tube journaling the drill tube,
   means for supporting a pole in alignment with the tubes,
   bit means carried by the drill tube for drilling a hole in the pole of a size sufficient to closely receive the guide tube,
   means for rotating the drill tube and the bit means,
   means for rotating the guide tube,
   means for advancing the drill tube, the bit means and the guide tube to and into the pole,
   the bit means including a tubular head and cutter means positioned in advance of the head,
   the tubular head and the forward end of the guide tube defining a nozzle, and
   means for forcing a fluid through the annular passage, the nozzle, the head and the drill tube.
2. The pole boring machine of claim 1 wherein the nozzle is substantially annular and is constricted relative to the annular passage.
3. The boring machine of claim 1 wherein the bit means includes an open bridge member secured to the end of the head and the cutter members are mounted on the bridge member.

4. The pole boring machine of claim 1 including bridge means on the tubular head,
a pilot pin carried by the bridge means in a centered position relative to the tubular head,
the bit means including a first bit carried by the bridge means and extending radially outwardly to points beyond the outer periphery of the guide tube, and
a second bit carried by the bridge means and extending outwardly only to points inside the outer periphery of the tubular head and positioned forwardly of the first bit.

5. In a pole boring machine for boring straight holes,
a drill tube,
a guide tube concentric to the drill tube and defining an annular passage therebetween,
means in the guide tube journaling the drill tube,
means for supporting a pole in alingment with the tubes,
bit means carried by the drill tube for drilling a hole in the pole of a size sufficient to closely receive the guide tube,
means for rotating the drill tube and the bit means at a predetermined high rate of speed,
means for rotating the guide tube at a slow rate of speed, and
means for advancing the drill tube, the bit means and the guide tube to and into the pole.

6. The pole boring machine of claim 5 including means for forcing a fluid into the annular passage between the guide tube and the drill tube and out of the drill tube.

7. The pole boring machine of claim 6 wherein the bit means is positioned immediately ahead of the guide tube, the bit means including a tapered tubular member secured to the drill tube and forming a tapered passage with the adjacent end portion of the guide tube.

8. The boring machine of claim 7 wherein the bit means includes an open bridge member secured to the end of the tubular member, a pilot pin carried by the bridge member, and cutter members mounted on the bridge member.

References Cited
UNITED STATES PATENTS

| | | | |
|---|---|---|---|
| 53,896 | 4/1866 | Stewart | 144—113 |
| 363,874 | 5/1887 | Wood et. al. | 77—21 X |
| 772,043 | 10/1904 | Kleinschmidt | 144—113 |
| 936,330 | 10/1909 | Lambert | 144—113 |
| 1,057,819 | 4/1913 | Garlock | 144—113 X |
| 1,281,420 | 10/1918 | Reid. | 144—113 |

DONALD R. SCHRAN, Primary Examiner

U.S. Cl. X.R.

77—68; 277—58